United States Patent
Jones et al.

(10) Patent No.: US 10,302,198 B2
(45) Date of Patent: May 28, 2019

(54) SEALING INTERFACE FOR CORROSION PROTECTION

(71) Applicant: GM GLOBAL TECHNOLOGY OPERATIONS LLC, Detroit, MI (US)

(72) Inventors: Marie-Christine G. Jones, Bingham Farms, MI (US); William R. Rodgers, Bloomfield Township, MI (US); David R. Staley, Flushing, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 127 days.

(21) Appl. No.: 15/346,325

(22) Filed: Nov. 8, 2016

(65) Prior Publication Data

US 2018/0128372 A1    May 10, 2018

(51) Int. Cl.
| | | |
|---|---|---|
| *F16J 15/02* | (2006.01) | |
| *B60K 15/03* | (2006.01) | |
| *B65D 8/00* | (2006.01) | |
| *F16J 15/06* | (2006.01) | |

(52) U.S. Cl.
CPC ............. *F16J 15/022* (2013.01); *B60K 15/03* (2013.01); *B65D 15/24* (2013.01); *F16J 15/064* (2013.01); *B60K 2015/03039* (2013.01); *B60K 2015/03059* (2013.01); *B60K 2015/03486* (2013.01)

(58) Field of Classification Search
CPC ........ F16J 15/022; F16J 15/064; B65D 15/24; B65D 90/08; B60K 2015/03453; B60K 15/03; B60K 15/03006; B64D 37/02
USPC .............................. 220/562, 4.12, 4.14, 4.17
See application file for complete search history.

(56) References Cited

U.S. PATENT DOCUMENTS

| | | | | |
|---|---|---|---|---|
| 2,592,419 A * | 4/1952 | Harper | ................... | B65D 85/84 220/4.17 |
| 6,305,568 B1* | 10/2001 | Suzuki | ............. | B60K 15/03177 220/562 |
| 6,715,626 B2* | 4/2004 | Balzer | ............... | B60K 15/03177 220/4.13 |
| 8,931,158 B2* | 1/2015 | Morrison | ................. | B05D 1/06 220/4.12 |
| 2003/0219620 A1* | 11/2003 | Carey, II | .............. | B23K 35/262 428/648 |

(Continued)

FOREIGN PATENT DOCUMENTS

| | | | | |
|---|---|---|---|---|
| DE | 102011081973 A1 | 3/2013 | | |
| DE | 102012023857 A1 * | 6/2014 | .............. | F02F 11/00 |

*Primary Examiner* — Shawn M Braden
(74) *Attorney, Agent, or Firm* — Quinn IP Law (57) ABSTRACT

A sealing interface configured to prevent galvanic corrosion of a container having parts made of dissimilar materials includes a first part, a second part, and a sealant. The first part has a first sealing surface and a first exterior surface substantially perpendicular to the first sealing surface. The second part has a second sealing surface and a second exterior surface substantially perpendicular to the second sealing surface. One of the parts includes an external sealing chamfer on the respective sealing surface extending to the respective exterior surface. The sealant at least fills a space formed between the external sealing chamfer and the sealing surface of the other of the parts when the parts are connected, forming a barrier between the parts such that the exterior surfaces of the parts are not in contact and are separated by the sealant. The exterior surfaces may be flush when the parts are connected.

20 Claims, 6 Drawing Sheets

(56) References Cited

U.S. PATENT DOCUMENTS

| | | | |
|---|---|---|---|
| 2005/0269333 A1* | 12/2005 | Burrington | B60K 15/03177 |
| | | | 220/562 |
| 2013/0020768 A1* | 1/2013 | Ruckh | B60T 11/236 |
| | | | 277/312 |
| 2014/0165956 A1* | 6/2014 | Griffiths | F01M 11/00 |
| | | | 123/196 R |
| 2016/0268790 A1* | 9/2016 | Panfil | H01Q 1/48 |

* cited by examiner

SEALING INTERFACE FOR CORROSION PROTECTION

INTRODUCTION

This disclosure relates to a sealing interface for corrosion protection of a fluid container. The fluid container may include parts made of dissimilar materials that are connected at a sealing interface. The exterior of the fluid container and the sealing interface may be subjectable to drops of an electrolyte fluid, such as water or salt water, which may cause galvanic corrosion of the fluid container.

SUMMARY

A sealing interface, a vehicle component, and a vehicle are disclosed herein. The sealing interface is configured to prevent galvanic corrosion of a container. The container is configured to retain a fluid in an interior cavity formed by the container. The container has parts made of dissimilar materials connected at the sealing interface. The container is subjectable to drops of an electrolyte on an exterior surface of the container. The sealing interface includes a first part, a second part, and a sealant. The first part has a first sealing surface and a first exterior surface substantially perpendicular to the first sealing surface. The second part is connectable to the first part. The second part has a second sealing surface and a second exterior surface substantially perpendicular to the second sealing surface.

The first sealing surface, the second sealing surface, and the sealant are configured to cooperate to form together a sealed connection to retain the fluid in the interior cavity of the container when the first and second parts are connected. One of the first and second parts includes an external sealing chamfer on the respective sealing surface extending to the respective exterior surface. The sealant at least fills a first space formed between the external sealing chamfer and the sealing surface of the other of the first and second parts when the first and second parts are connected, forming a barrier between the first and second parts such that the exterior surfaces of the first and second parts are not in contact and are separated by the sealant.

The second exterior surface may be configured to be flush with the first exterior surface at the sealing interface when the first and second parts are connected such that the drops of the electrolyte are not trapped at the sealing interface and are prevented from extending from the first exterior surface to the second exterior surface.

The first part may be made of a first material having a first electrode potential. The first sealing surface may include a first contact surface. The second part may be made of a second material having a second electrode potential different from the first electrode potential. The second sealing surface may include a second contact surface configured to conform to and contact the first contact surface when the first and second parts are connected. The external sealing chamfer may extend from the respective contact surface to the respective exterior surface.

The sealant may extend outward of the exterior surfaces of the first and second parts to form an exterior sealant bead such that the drops of the electrolyte are prevented from extending from the first exterior surface to the second exterior surface. The sealant may extend outward of the exterior surfaces of the first and second parts by an extension of at least 1 mm. The sealant may extend outward of the exterior surfaces of the first and second parts by an extension of at least 3 mm.

The external sealing chamfer may include a shelf portion proximate to the contact surface. The sealant may be a Room Temperature Vulcanizate (RTV) sealant. One of the first and second parts may be a block and the other of the first and second parts may be a block extension. One of the first and second materials may be an aluminum alloy and the other of the first and second materials may be a carbon fiber reinforced plastic material. One of the first and second parts may be an engine block made of an aluminum alloy and the other of the first and second parts may be an engine block extension made of a carbon fiber reinforced plastic material or a magnesium alloy.

The sealing interface may further include a fastener extending through the sealing surfaces and configured to connect the first part to the second part. The first part may have a first interior surface substantially perpendicular to the first sealing surface. The second part may have a second interior surface substantially perpendicular to the second sealing surface. The one of the first and second sealing surfaces that includes the external sealing chamfer may further include an internal sealing chamfer extending from the respective contact surface to the respective interior surface. The sealant may at least fill a second space formed between internal sealing chamfer and the other of the first and second sealing surfaces when the first and second parts are connected. The internal sealing chamfer may further extend to the external sealing chamfer such that the external and internal sealing chamfers together circumferentially surround the fastener when the first and second parts are connected. The sealant may circumferentially surround the fastener when the first and second parts are connected. The internal sealing chamfer may include a shelf portion proximate to the contact surface.

The one of the first and second sealing surfaces that includes the external sealing chamfer may further include an inner sealing chamfer within the respective contact surface. The inner sealing chamfer may extend to the external sealing chamfer such that the external and inner sealing chamfers together circumferentially surround the fastener when the first and second parts are connected. The sealant may fill a third space formed between inner sealing chamfer and the other of the first and second sealing surfaces when the first and second parts are connected. The sealant may circumferentially surround the fastener when the first and second parts are connected. The inner sealing chamfer may include a shelf portion proximate to the contact surface.

The vehicle component includes a container configured to retain a fluid in an interior cavity formed by the container. The container is subjectable to drops of an electrolyte on an exterior surface of the container. The container includes a first part, a second part, and a sealant. The first part is made of a first material having a first electrode potential. The first part has a first sealing surface including a first contact surface. The first part also has a first exterior surface substantially perpendicular to the first sealing surface. The second part is connected to the first part and is made of a second material having a second electrode potential different from the first electrode potential. The second part has a second sealing surface including a second contact surface configured to conform to and contact the first contact surface. The second part also has a second exterior surface substantially perpendicular to the second sealing surface.

The first sealing surface, the second sealing surface, and the sealant are configured to cooperate to form together a sealed connection to retain the fluid in the interior of the container. One of the first and second parts includes an external sealing chamfer on the respective sealing surface extending from the respective contact surface to the respective exterior surface. The sealant at least fills a first space formed between the external sealing chamfer and the sealing surface of the other of the first and second parts, forming a barrier between the first and second parts such that the exterior surfaces of the first and second parts are not in contact and are separated by the sealant.

The second exterior surface may be configured to be flush with the first exterior surface such that the drops of the electrolyte are not trapped at the sealing interface and are prevented from extending from the first exterior surface to the second exterior surface. The sealant may extend outward of the exterior surfaces of the first and second parts to form an exterior sealant bead such that the drops of the electrolyte are prevented from extending from the first exterior surface to the second exterior surface.

The method is provided for forming a sealing interface between a first part of a first material and a second part of a second material, different from the first material. The first part has a first exterior surface. The second part has a second exterior surface. Together, the first and second parts form a container having an interior and an exterior. The container is for operation in the presence of drops of an electrolyte. The method includes: squeezing a sealant between the first and second parts toward the exterior of the container; and forming the squeezed sealant into an external sealing chamfer between the first and second parts forming a barrier between the first and second parts at the exterior of the container such that the exterior surfaces of the first and second parts are not in contact and are separated by the sealant.

The method may include configuring the first exterior surface of the first part to be flush with the second exterior surface of the second part at the sealing interface such that any of the drops of the electrolyte are not trapped at the sealing interface and are prevented from extending from the first exterior surface to the second exterior surface.

The sealing interface, the vehicle component, and the method disclosed herein prevent galvanic corrosion of a fluid container including parts made of dissimilar materials connected at a sealing interface and subjectable to drops of an electrolyte. This disclosure applies to any machine or manufacture including a fluid container having parts made of dissimilar materials connected at a sealing interface. This disclosure applies to any vehicle, including but not limited to cars, trucks, vans, all-terrain vehicles, busses, boats, trains, airplanes, manufacturing vehicles and equipment, construction vehicles and equipment, maintenance vehicles and equipment, etc.

The above features and advantages and other features and advantages of the present disclosure are readily apparent from the following detailed description of the best modes for carrying out the disclosure when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
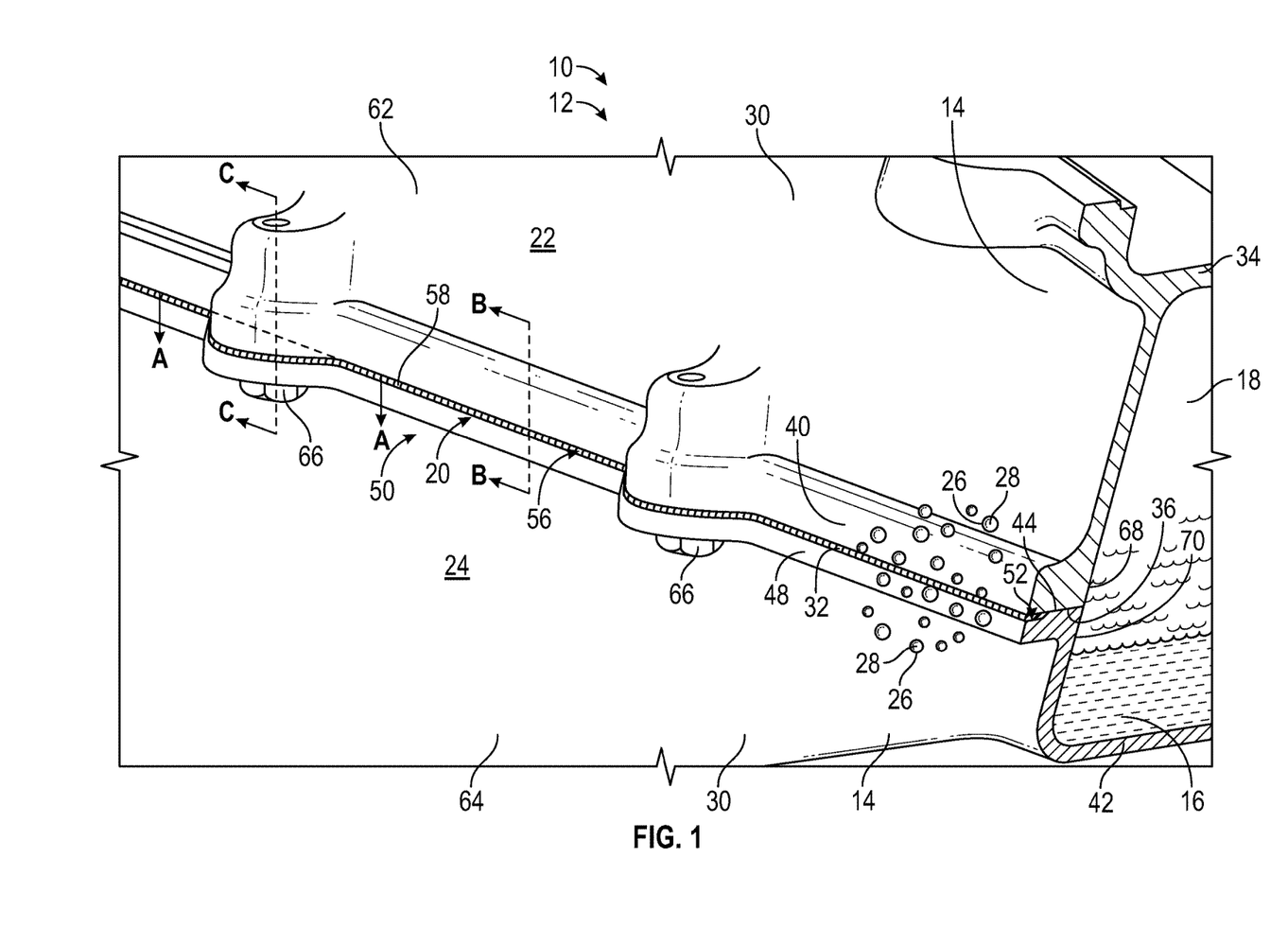
FIG. 1 is a fragmentary, schematic, cross-sectional illustration, partially in elevation, of a container having a sealing interface of the type disclosed herein.

Referring to the drawings, wherein like reference numbers refer to like components throughout the views, FIG. 1 shows an example vehicle 10. The example vehicle 10 includes a sealing interface 20 of the type disclosed herein. While the vehicle 10 of FIG. 1 is an example application suitable for the sealing interface 20 disclosed herein, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the sealing interface 20 to such an embodiment.

Referring now to FIG. 1, the example vehicle 10 includes a vehicle component 12. The vehicle component 12 may be an engine, a transmission, a gear box, a hydraulic component, or another component used in a vehicular or non-vehicular application. The component 12 includes a container 14. The container 14 is configured to retain a fluid 16 in an interior cavity 18 formed by the container 14. The fluid 16 may be a lubricant, a hydraulic fluid, a fuel, a coolant fluid, a cleaning fluid, or another type of fluid. The container 14 has parts 22, 24 made of dissimilar materials connected at the sealing interface 20. The sealing interface 20 is configured to prevent galvanic corrosion of the container 14.

The container 14 is subjectable to drops 26 of an electrolyte 28 on an exterior surface 30 of the container 14. The electrolyte 28 may be water, salt water, or another electrically conducting fluid that contains ions and permits the flow of current via the movement of the ions. The drops 26 of the electrolyte 28 may result from of a spray, a splash, a precipitation, or another event that produces drops 26 of the electrolyte 28.

Referring now to FIGS. 1-5C, the sealing interface 20 includes a first part 22, a second part 24, and a sealant 32. The first part 22 may be made of a first material 34 having a first electrode potential. The first part 22 has a first sealing surface 36. The first sealing surface 36 may include a first contact surface 38. The first part 22 also has a first exterior surface 40 substantially perpendicular to the first sealing surface 36. The second part 24 is connectable to the first part 22.

The second part 24 may be made of a second material 42 having a second electrode potential that is different from the first electrode potential. The second part 24 has a second sealing surface 44. The second sealing surface 44 may include a second contact surface 46 configured to conform to and contact the first contact surface 38 when the first part 22 and the second part 24 are connected such that an electrical current may flow from one of the parts 22, 24 to the other of the parts 22, 24 via the contact surfaces 38, 46 when the parts 22, 24 are connected. The second part 24 also has a second exterior surface 48 substantially perpendicular to the second sealing surface 44. The exterior surface 30 of the container 14 includes the first exterior surface 40 of the first part 22 and the second exterior surface 48 of the second part 24.

Electrode potential determines the nobility of metal and semi-metal materials. When two metal or semi-metal materials are submerged in an electrolyte, while also electrically connected, the less noble material will experience galvanic corrosion. The rate of corrosion is determined by the electrolyte and the difference in nobility. For example, carbon (more noble) and aluminum (less noble) have an approximately one volt difference in electrode potential. Galvanic corrosion of an aluminum or aluminum alloy material will occur if the aluminum or aluminum alloy material is connected to a carbon or a carbon fiber reinforced plastic material and submerged in water, salt water, or another electrolyte. Submersion is not required for galvanic corrosion to occur. Galvanic corrosion of the aluminum or aluminum alloy material will occur even if the electrolyte merely extends from the aluminum or aluminum alloy material to the carbon or carbon fiber reinforced plastic material.

The first sealing surface 36, the second sealing surface 44, and the sealant 32 are configured to cooperate to form together a sealed connection 50 to retain the fluid 16 in the interior cavity 18 of the container 14 when the first and second parts 22, 24 are connected. One of the first and second parts 22, 24 includes an external sealing chamfer 52 on the respective sealing surface 36, 44 extending to the respective exterior surface 40, 48. The external sealing chamfer 52 may extend from the respective contact surface 38, 46 to the respective exterior surface 40, 48.

The sealant 32 at least fills a first space 54 formed between the external sealing chamfer 52 and the sealing surface 36, 44 of the other of the first and second parts 22, 24 when the first and second parts 22, 24 are connected, forming a barrier 56 between the first and second parts 22, 24 such that the exterior surfaces 40, 48 of the first and second parts 22, 24 are not in contact and are separated by the sealant 32. The barrier 56 may prevent the drops 26 of the electrolyte 28 from extending from the first exterior surface 40 to the second exterior surface 48. The barrier 56 may prevent the drops 26 of the electrolyte 28 from bridging between the first exterior surface 40 and the second exterior surface 48.

The first sealing surface 36, the second sealing surface 44, and the sealant 32 may be configured to cooperate to both form together the sealed connection 50 to retain the fluid 16 in the interior cavity 18 of the container 14 and to form the barrier 56 between the first and second parts 22, 24 such that the exterior surfaces 40, 48 of the first and second parts 22, 24 are not in contact and are separated by the sealant 32 when the first and second parts 22, 24 are connected, as best seen in FIGS. 1, 2B, 3B, and 5B.

Referring again to FIGS. 1-5C, the sealant 32 may not be disposed between the contact surfaces 38, 46 of the parts 22, 24 when the first and second parts 22, 24 are connected such that the contact surface 38, 46 of the parts 22, 24 are at least partially in direct contact when the parts 22, 24 are connected. The contact surfaces 38, 46 of the parts 22, 24 may be at least partially in direct contact when the parts 22, 24 are connected such that an electrical current may flow from one of the parts 22, 24 to the other of the parts 22, 24 via the contact surfaces 38, 46 when the parts 22, 24 are connected.

The external sealing chamfer 52 may include an external portion 57 proximate to the respective exterior surface 40, 48 and a transition portion 59 extending from the external portion 57 to the respective contact surface 38, 46.

The second exterior surface 48 may be configured to be flush with the first exterior surface 40 at the sealing interface 20 when the first and second parts 22, 24 are connected such that the drops 26 of the electrolyte 28 are not trapped at the sealing interface 20 and are prevented from extending from the first exterior surface 40 to the second exterior surface 48. Flush is defined herein as even with or forming the same plane. In other words the second exterior surface 48 may be configured to extend along the same plane as the first exterior surface 40 at the sealing interface 20 when the first and second parts 22, 24 are connected.

The sealant 32 may extend outward of the exterior surfaces 40, 48 of the first and second parts 22, 24 by an extension 60 to form an exterior sealant bead 58 such that the drops 26 of the electrolyte 28 are prevented from extending from the first exterior surface 40 to the second exterior surface 48. The sealant 32 may extend outward of the exterior surfaces 40, 48 of the first and second parts 22, 24 by an extension 60 of at least 1 mm. The sealant 32 may extend outward of the exterior surfaces 40, 48 of the first and second parts 22, 24 by an extension 60 of at least 3 mm.

Figure 5A:
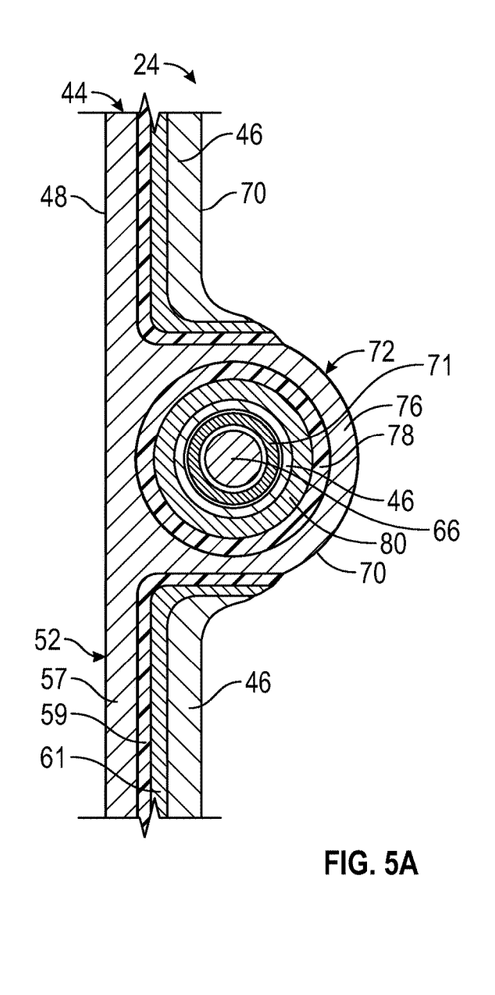
FIG. 5A is a schematic, cross-sectional illustration of a fourth example of the sealing interface of FIG. 1, taken at line A-A of FIG. 1, with the sealant removed for clarity.
Figure 5B:
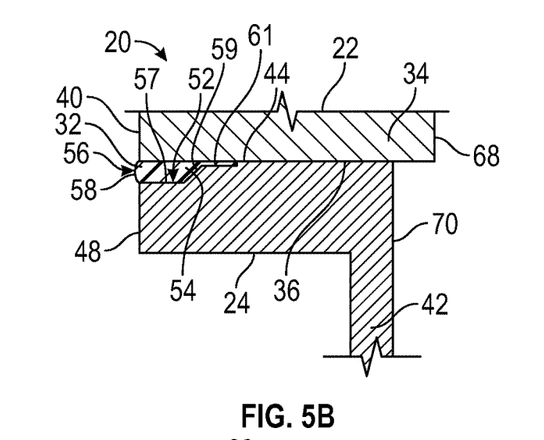
FIG. 5B is a schematic, cross-sectional illustration of the fourth example of the sealing interface of FIG. 1, taken at line B-B of FIG. 1.
Figure 5C:
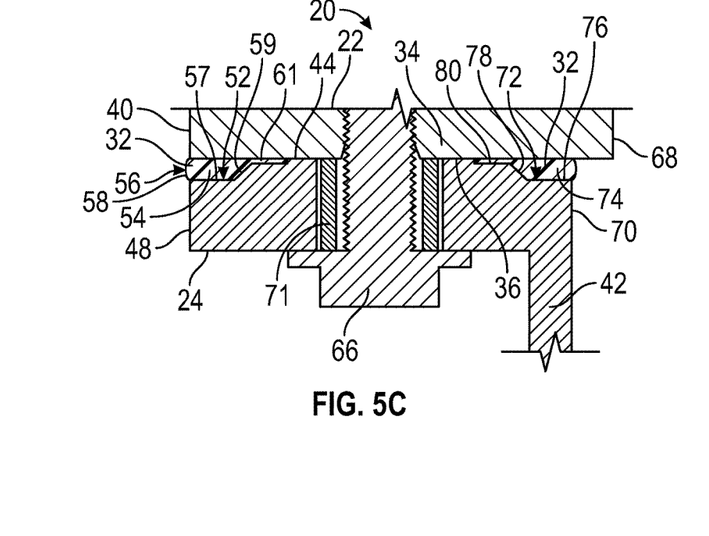
FIG. 5C is a schematic, cross-sectional illustration of the fourth example of the sealing interface of FIG. 1, taken at line C-C of FIG. 1.

Referring now specifically to FIGS. 5A-C, the external sealing chamfer 52 may include the external portion 57, the transition portion 59, and a shelf portion 61. The external portion 57 may be proximate to the respective exterior surface 40, 48, the shelf portion 61 may be proximate to the respective contact surface 38, 46, and the transition portion 59 may extend from the external portion 57 to the shelf portion 61.

Referring again to FIGS. 1-5C, the sealant 32 may be a Room Temperature Vulcanizate (RTV) sealant or another suitable sealant material. One of the first and second parts 22, 24 may be a housing, such as a transmission housing (not shown), or a block, such as an engine block 62, and the other of the first and second parts may be an engine block extension or lower crankcase 64. Alternatively, the other of the first and second parts may be an oil pan. One of the first and second materials 34, 42 may be an aluminum alloy and the other of the first and second materials 34, 42 may be a carbon fiber reinforced plastic material. Alternatively, one of the first and second materials 34, 42 may be a magnesium alloy and the other of the first and second materials 34, 42 may be an aluminum alloy. One of the first and second parts 22, 24 may be an engine block 62 made of an aluminum alloy and the other of the first and second parts 22, 24 may be an engine block extension or lower crankcase 64 made of a carbon fiber reinforced plastic material. Alternatively, one of the first and second parts 22, 24 may be an engine block 62 made of an aluminum alloy and the other of the first and second parts 22, 24 may be a block extension or lower crankcase 64 made of a magnesium alloy.

Figure 4A:
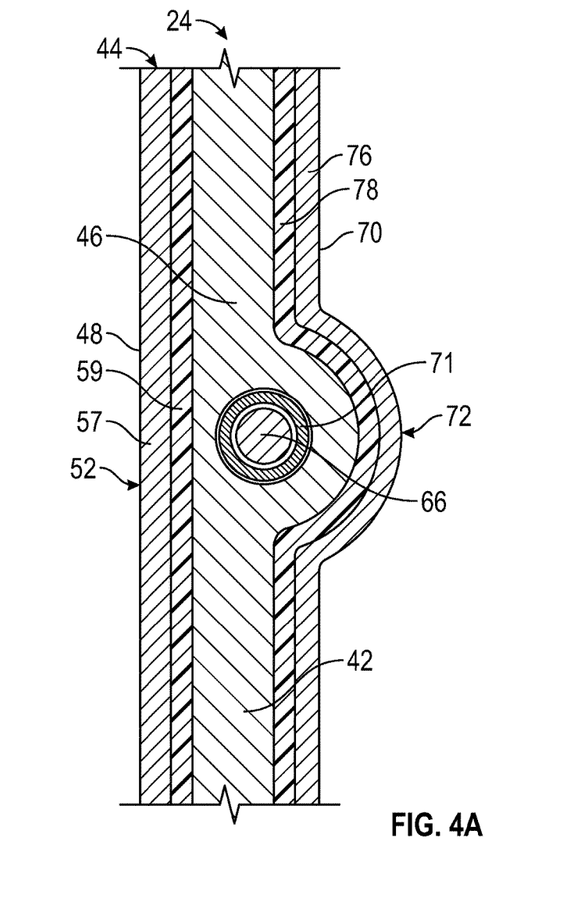
FIG. 4A is a schematic, cross-sectional illustration of a third example of the sealing interface of FIG. 1, taken at line A-A of FIG. 1, with the sealant removed for clarity.
Figure 4B:
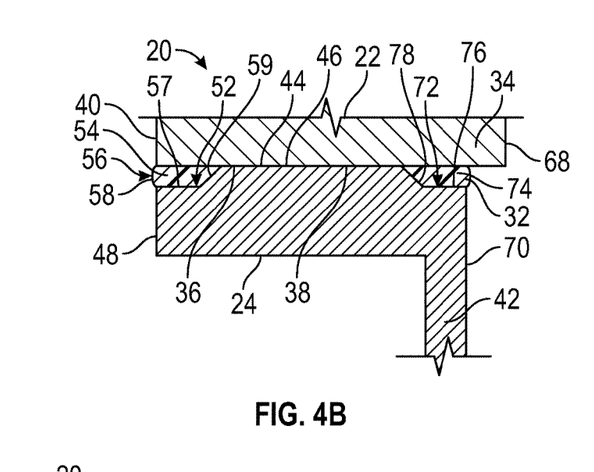
FIG. 4B is a schematic, cross-sectional illustration of the third example of the sealing interface of FIG. 1, taken at line B-B of FIG. 1.
Figure 4C:
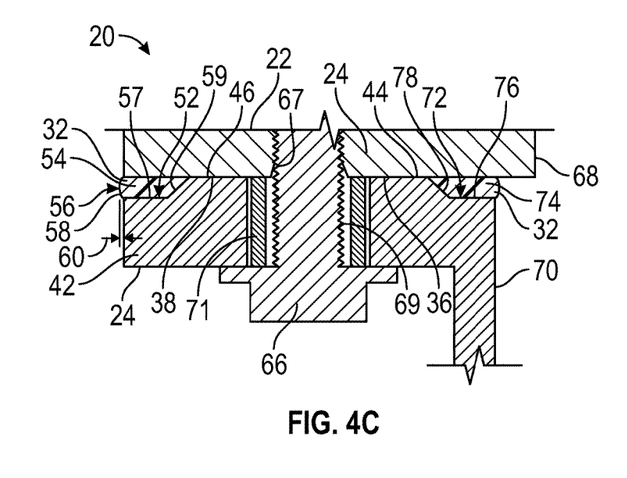
FIG. 4C is a schematic, cross-sectional illustration of the third example of the sealing interface of FIG. 1, taken at line C-C of FIG. 1.

Referring now specifically to FIGS. 4A-4C, the sealing interface 20 may further include a fastener 66 extending through the sealing surfaces 36, 44 and configured to connect the first part 22 to the second part 24. The first part 22 may have a first interior surface 68 substantially perpendicular to the first sealing surface 36. The second part 24 may have a second interior surface 70 substantially perpendicular to the second sealing surface 44. The one of the first and second sealing surfaces 36, 44 that includes the external sealing chamfer 52 may further include an internal sealing chamfer 72 extending from the respective contact surface 38, 46 to the respective interior surface 68, 70. The sealant 32 may at least fill a second space 74 formed between internal sealing chamfer 72 and the other of the first and second sealing surfaces 36, 44 when the first and second parts 22, 24 are connected.

One of the first and second parts 22, 24 may include an internal thread 67. The fastener 66 may include an external thread 69 configured to engage the internal thread 67 when the first and second parts 22, 24 are connected. The fastener 66 may be a threaded bolt, as shown, or another suitable fastener The sealing interface may further include a compression limiter 71 configured to limit compression of one of the first and second parts 22, 24 when the first and second parts 22, 24 are connected via the fastener 66.

The internal sealing chamfer 72 may include an internal portion 76 proximate to the respective interior surface 68, 70 and a transition portion 78 extending from the internal portion 76 to the respective contact surface 38, 46.

Referring now to FIG. 5A-C, the internal sealing chamfer 72 may include an internal portion 76, a transition portion 78, and a shelf portion 80. The internal portion 76 may be proximate to the respective interior surface 70, 72. The shelf portion 80 may be proximate to the respective contact surface 38, 46. The transition portion 78 may extend from the internal portion 76 to the shelf portion 80.

Figure 2A:
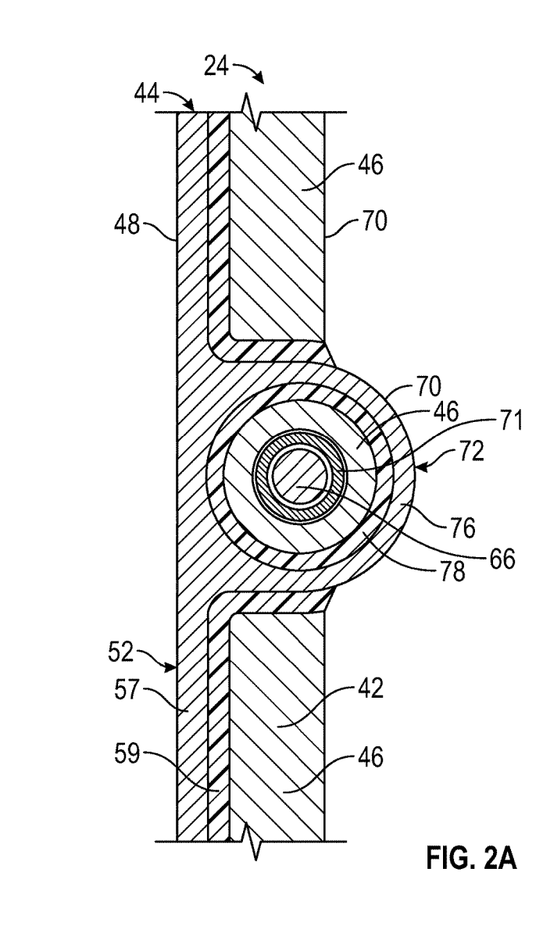
FIG. 2A is a schematic, cross-sectional illustration of a first example of the sealing interface of FIG. 1, taken at line A-A of FIG. 1, with a sealant removed for clarity.
Figure 2B:
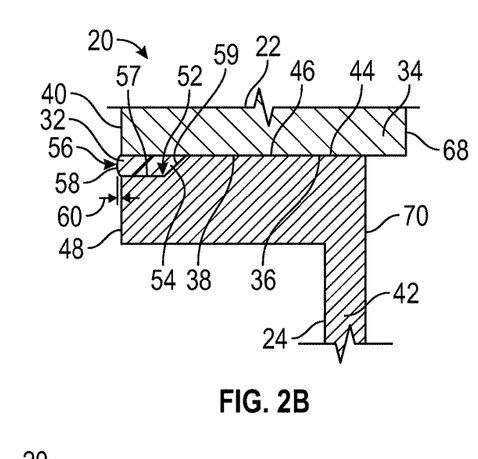
FIG. 2B is a schematic, cross-sectional illustration of the first example of the sealing interface of FIG. 1, taken at line B-B of FIG. 1.
Figure 2C:
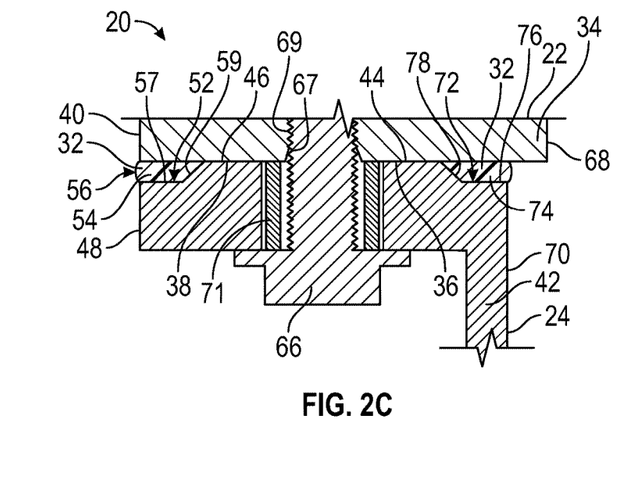
FIG. 2C is a schematic, cross-sectional illustration of the first example of the sealing interface of FIG. 1, taken at line C-C of FIG. 1.

Referring now to FIGS. 2A and 5A, the internal sealing chamfer 72 may further extend to the external sealing chamfer 52 such that the external and internal sealing chamfers 52, 72 together circumferentially surround the fastener 66 when the first and second parts 22, 24 are connected. The sealant 32 may circumferentially surround the fastener 66 when the first and second parts 22, 24 are connected.

Figure 3A:
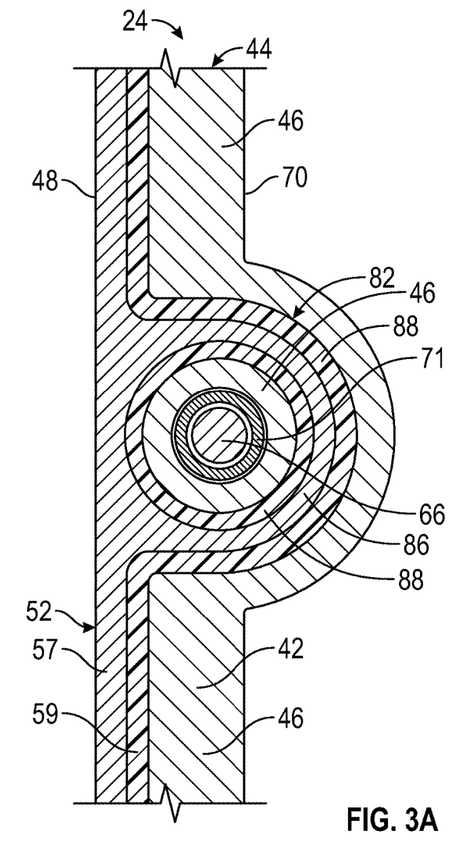
FIG. 3A is a schematic, cross-sectional illustration of a second example of the sealing interface of FIG. 1, taken at line A-A of FIG. 1, with the sealant removed for clarity.
Figure 3B:
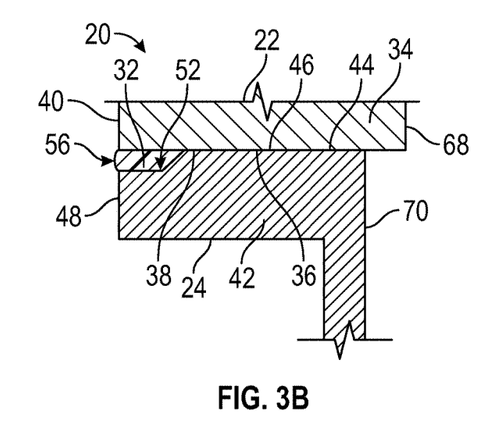
FIG. 3B is a schematic, cross-sectional illustration of the second example of the sealing interface of FIG. 1, taken at line B-B of FIG. 1.
Figure 3C:
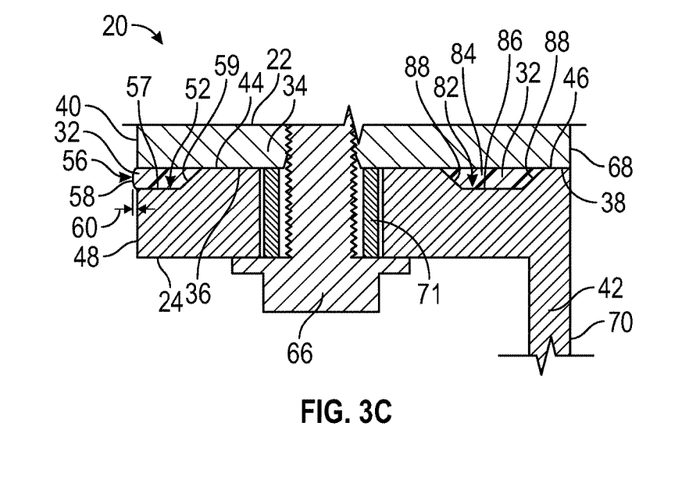
FIG. 3C is a schematic, cross-sectional illustration of the second example of the sealing interface of FIG. 1, taken at line C-C of FIG. 1.

Referring now to FIGS. 3A-C, the one of the first and second sealing surfaces 36, 44 that includes the external sealing chamfer 52 may further include an inner sealing chamfer 82 within the respective contact surface 38, 46. The inner sealing chamfer 82 may extend to the external sealing chamfer 52 such that the external and inner sealing chamfers 52, 82 together circumferentially surround the fastener 66 when the first and second parts 22, 24 are connected. The sealant 32 may fill a third space 84 formed between inner sealing chamfer 82 and the other of the first and second sealing surfaces 36, 44 when the first and second parts 22, 24 are connected. The inner sealing chamfer 82 may extend to the external sealing chamfer 52 such that the external and inner sealing chamfers 52, 82 together circumferentially surround the fastener 66 when the first and second parts 22, 24 are connected. The sealant 32 may circumferentially surround the fastener 66 when the first and second parts 22, 24 are connected.

The inner sealing chamfer 82 may include an inner portion 86 and a transition portion 88 extending from the inner portion 86 to the respective contact surface 38, 46. The inner sealing chamfer 82 may include an inner portion 86, a transition portion 88, and a shelf portion (not shown), similar to the shelf portion 61 of the external sealing chamfer 52 and the shelf portion 80 of the internal sealing chamfer 72, shown in FIGS. 5A-5C. The shelf portion of the inner sealing chamfer 82 may be proximate to the respective contact surface 38, 46. The transition portion 88 may extend from the inner portion 86 to the shelf portion of the inner sealing chamfer 82. The inner sealing chamfer 82 may include a plurality of shelf portions and transition portions 88.

Figure 6:
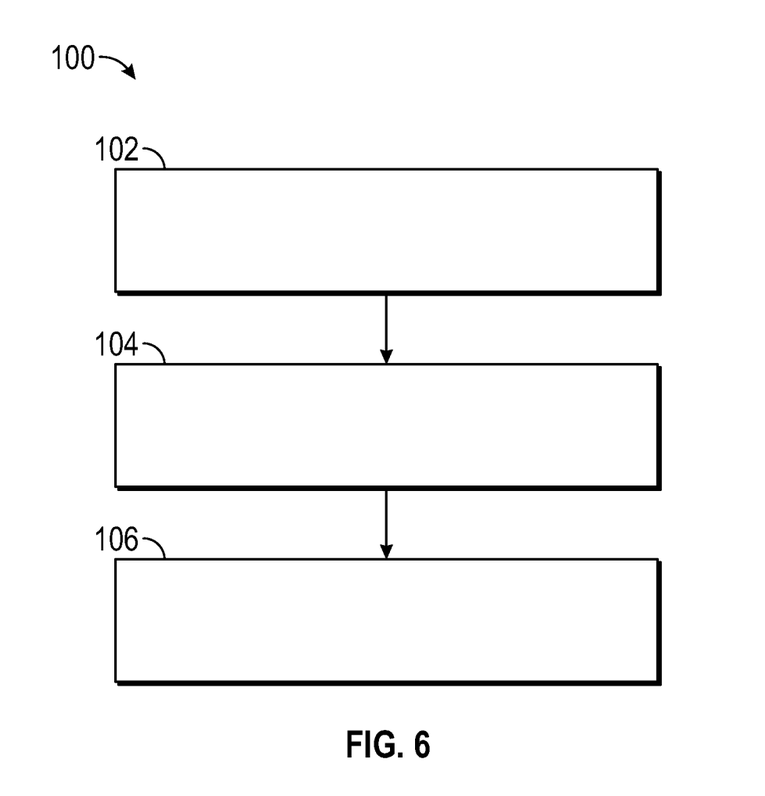
FIG. 6 is an example flow chart of a method for forming a sealing interface between a first part of a first material and a second part of a second material, different from the first material.

Referring now to FIG. 6, a method 100 is provided for forming the sealing interface 20, as disclosed above, between a first part 22 of a first material 34 and a second part 24 of a second material 42, different from the first material 34. The first part 22 has a first exterior surface 40. The second part 24 has a second exterior surface 48. Together, the first and second parts 22, 24 form a container 14 having an interior cavity 18 and an exterior surface 30. The container 14 is for operation in the presence of drops 26 of an electrolyte 28.

The method 100 includes step 102 and 104. At step 102, a sealant 32 is squeezed between the first and second parts 22, 24 toward the exterior surface 30 of the container 14. At step 104, the squeezed sealant 32 is formed into an external sealing chamfer 52 between the first and second parts 22, 24 forming a barrier 56 between the first and second parts 22, 24 at the exterior surface 30 of the container 14 such that the exterior surfaces 40, 48 of the first and second parts 22, 24 are not in contact and are separated by the sealant 32. The method 100 may include step 106. At step 106, the first exterior surface 40 of the first part 22 may be configured to be flush with the second exterior surface 48 of the second part 24 at the sealing interface 20 such that the drops 26 of electrolyte 28 are not trapped at the sealing interface 20 and are prevented from extending from the first exterior surface 40 to the second exterior surface 48.

While the best modes for carrying out the disclosure have been described in detail, those familiar with the art to which this disclosure relates will recognize various alternative designs and embodiments for practicing the disclosure within the scope of the appended claims.

What is claimed is:

1. A sealing interface configured to prevent galvanic corrosion of a container configured to retain a fluid in an interior cavity formed by the container, having parts made of dissimilar materials connected at the sealing interface, and subjectable to drops of an electrolyte on an exterior surface of the container, the sealing interface comprising:
   a first part, having:
      a first sealing surface; and
      a first exterior surface substantially perpendicular to the first sealing surface;
   a second part connectable to the first part, having:
      a second sealing surface; and a second exterior surface substantially perpendicular to the second sealing surface; and
a sealant;
wherein the first sealing surface, the second sealing surface, and the sealant are configured to cooperate to form together a sealed connection to retain the fluid in the interior cavity of the container when the first and second parts are connected;
wherein one of the first and second parts includes an external sealing chamfer on the respective sealing surface extending to the respective exterior surface; and
wherein the sealant at least fills a first space formed between the external sealing chamfer and the sealing surface of the other of the first and second parts when the first and second parts are connected, forming a barrier between the first and second parts such that the exterior surfaces of the first and second parts are not in contact and are separated by the sealant.

2. The sealing interface of claim 1, wherein the second exterior surface is configured to be flush with the first exterior surface at the sealing interface when the first and second parts are connected such that the drops of the electrolyte are not trapped at the sealing interface and are prevented from extending from the first exterior surface to the second exterior surface.

3. The sealing interface of claim 1, wherein the first part is made of a first material having a first electrode potential;
wherein the first sealing surface includes a first contact surface;
wherein the second part is made of a second material having a second electrode potential different from the first electrode potential;
wherein the second sealing surface includes a second contact surface configured to conform to and contact the first contact surface when the first and second parts are connected; and
wherein the external sealing chamfer extends from the respective contact surface to the respective exterior surface.

4. The sealing interface of claim 1, wherein the sealant extends outward of the exterior surfaces of the first and second parts to form an exterior sealant bead such that the drops of the electrolyte are prevented from extending from the first exterior surface to the second exterior surface.

5. The sealing interface of claim 4, wherein the sealant extends outward of the exterior surfaces of the first and second parts by an extension of at least 1 mm.

6. The sealing interface of claim 4, wherein the sealant extends outward of the exterior surfaces of the first and second parts by an extension of at least 3 mm.

7. The sealing interface of claim 3, wherein the external sealing chamfer includes a shelf portion proximate to the contact surface.

8. The sealing interface of claim 1, wherein one of the first and second parts is a block and the other of the first and second parts is a block extension.

9. The sealing interface of claim 1, wherein one of the first and second materials is an aluminum alloy; and
wherein the other of the first and second materials is a carbon fiber reinforced plastic material.

10. The sealing interface of claim 1, wherein one of the first and second parts is an engine block made of an aluminum alloy and the other of the first and second parts is an engine block extension made of a carbon fiber reinforced plastic material or a magnesium alloy.

11. The sealing interface of claim 3, wherein the sealing interface further comprises a fastener extending through the sealing surfaces and configured to connect the first part to the second part;
wherein the first part has a first interior surface substantially perpendicular to the first sealing surface;
wherein the second part has a second interior surface substantially perpendicular to the second sealing surface;
wherein the one of the first and second sealing surfaces that includes the external sealing chamfer further includes an internal sealing chamfer extending from the respective contact surface to the respective interior surface; and
wherein the sealant at least fills a second space formed between internal sealing chamfer and the other of the first and second sealing surfaces when the first and second parts are connected.

12. The sealing interface of claim 11, wherein the internal sealing chamfer further extends to the external sealing chamfer such that the external and internal sealing chamfers together circumferentially surround the fastener when the first and second parts are connected; and
wherein the sealant circumferentially surrounds the fastener when the first and second parts are connected.

13. The sealing interface of claim 11, wherein the internal sealing chamfer includes a shelf portion proximate to the contact surface.

14. The sealing interface of claim 3, wherein the sealing interface further comprises a fastener extending through the sealing surfaces and configured to connect the first part to the second part;
wherein the one of the first and second sealing surfaces that includes the external sealing chamfer further includes an inner sealing chamfer within the respective contact surface;
wherein the inner sealing chamfer extends to the external sealing chamfer such that the external and inner sealing chamfers together circumferentially surround the fastener when the first and second parts are connected; and
wherein the sealant fills a third space formed between inner sealing chamfer and the other of the first and second sealing surfaces when the first and second parts are connected; and
wherein the sealant circumferentially surrounds the fastener when the first and second parts are connected.

15. The sealing interface of claim 14, wherein the inner sealing chamfer includes a shelf portion proximate to the contact surface.

16. A vehicle component, comprising:
a container configured to retain a fluid in an interior cavity formed by the container and subjectable to drops of an electrolyte on an exterior surface of the container, the container including:
a first part made of a first material having a first electrode potential, the first part having:
a first sealing surface including a first contact surface; and
a first exterior surface substantially perpendicular to the first sealing surface;
a second part connected to the first part and made of a second material having a second electrode potential different from the first electrode potential, the second part having:
a second sealing surface including a second contact surface configured to conform to and contact the first contact surface; and a second exterior surface substantially perpendicular to the second sealing surface; and a sealant;

wherein the first sealing surface, the second sealing surface, and the sealant are configured to cooperate to form together a sealed connection to retain the fluid in the interior of the container;

wherein one of the first and second parts includes an external sealing chamfer on the respective sealing surface extending from the respective contact surface to the respective exterior surface; and wherein the sealant at least fills a first space formed between the external sealing chamfer and the sealing surface of the other of the first and second parts, forming a barrier between the first and second parts such that the exterior surfaces of the first and second parts are not in contact and are separated by the sealant.

17. The vehicle component of claim 16, wherein the second exterior surface is configured to be flush with the first exterior surface such that the drops of the electrolyte are not trapped at the sealing interface and are prevented from extending from the first exterior surface to the second exterior surface.

18. The vehicle component of claim 16, wherein the sealant extends outward of the exterior surfaces of the first and second parts to form an exterior sealant bead such that the drops of the electrolyte are prevented from extending from the first exterior surface to the second exterior surface.

19. A method of forming a sealing interface between a first part of a first material and having a first sealing surface and a first exterior surface substantially perpendicular to the first sealing surface and a second part of a second material, different from the first material, and having a second sealing surface and a second exterior surface substantially perpendicular to the second sealing surface that together form a container having an interior and an exterior for operation in the presence of drops of an electrolyte, the method comprising:

squeezing a sealant between the first and second parts toward the exterior of the container; and forming the squeezed sealant into an external sealing chamfer between the first and second parts forming a barrier between the first and second parts at the exterior of the container such that the exterior surfaces of the first and second parts are not in contact and are separated by the sealant;

wherein the first sealing surface, the second sealing surface, and the sealant are configured to cooperate to form together a sealed connection to retain a fluid in the interior cavity of the container when the first and second parts are connected;

wherein one of the first and second parts includes the external sealing chamfer on the respective sealing surface extending to the respective exterior surface; and wherein the sealant at least fills a first space formed between the external sealing chamfer and the sealing surface of the other of the first and second parts when the first and second parts are connected.

20. The method of claim 19, further comprising:

configuring the first exterior surface of the first part to be flush with the second exterior surface of the second part at the sealing interface such that the drops of the electrolyte are not trapped at the sealing interface and are prevented from extending from the first exterior surface to the second exterior surface.

* * * * *